US011340109B2

(12) United States Patent
Hennecke et al.

(10) Patent No.: US 11,340,109 B2
(45) Date of Patent: May 24, 2022

(54) ARRAY OF SINGLE-PHOTON AVALANCHE DIODE (SPAD) MICROCELLS AND OPERATING THE SAME

(71) Applicant: Infineon Technologies AG, Neubiberg (DE)

(72) Inventors: Marcus Edward Hennecke, Graz (AT); Boris Kirillov, Judendorf-Straßenge (AT); Thomas Thurner, Graz (AT)

(73) Assignee: Infineon Technologies AG

( * ) Notice: Subject to any disclaimer, the term of this patent is extended or adjusted under 35 U.S.C. 154(b) by 0 days.

(21) Appl. No.: 16/868,064

(22) Filed: May 6, 2020

(65) Prior Publication Data
US 2020/0370955 A1 Nov. 26, 2020

Related U.S. Application Data

(60) Provisional application No. 62/852,538, filed on May 24, 2019.

(51) Int. Cl.
*G01J 1/46* (2006.01)
*G01S 7/481* (2006.01)
*G01J 1/44* (2006.01)

(52) U.S. Cl.
CPC ............... *G01J 1/46* (2013.01); *G01S 7/4816* (2013.01); *G01J 2001/442* (2013.01); *G01J 2001/4466* (2013.01)

(58) Field of Classification Search
CPC ................ G01J 1/46; G01J 2001/442; G01J 2001/4466; G01S 7/4816; G01S 7/4865
See application file for complete search history.

(56) References Cited

U.S. PATENT DOCUMENTS

2011/0017918 A1* 1/2011 Baeumer ............... G01T 1/17
250/370.11
2015/0144797 A1* 5/2015 Dolinsky ............... G01T 1/248
250/366

OTHER PUBLICATIONS

Myung-Jae Lee, et al., "High-Performance Back-Illuminated Three-Dimensional Stacked Single-Photon Avalanche Diode Implemented in 45-nm CMOS Technology", IEEE Journal of Selected Topics in Quantum Electronics, vol. 24, Issue No. 6, Nov./Dec. 2018, [online] URL: <https://ieeexplore.ieee.org/stamp/stamp.jsp?arnumber=8338386>.

(Continued)

*Primary Examiner* — Kevin K Pyo
(74) *Attorney, Agent, or Firm* — Design IP

(57) ABSTRACT

A digital light detector includes a clock signal generator configured to generate a clock signal comprised of clock pulses generated at a predetermined frequency; a single-photon avalanche diode (SPAD) configured to turn on and generate an avalanche current in response to receiving a photon, the SPAD including an internal capacitor coupled internally between an anode terminal and an cathode terminal; and an active quenching-recharging circuit that is triggered by the clock signal. The active quenching-recharging circuit is configured to be activated and deactivated based on the clock signal, where the active quenching-recharging circuit is configured to recharge the internal capacitor on a condition the active quenching-recharging circuit is activated, and where the active quenching-recharging circuit is configured to discharge the internal capacitor on a condition the active quenching-recharging circuit is deactivated.

38 Claims, 10 Drawing Sheets

(56) References Cited

OTHER PUBLICATIONS

Alberto Gola, et al., "A Passive-Quenching Active-Recharge Analog Silicon Photomultiplier", IEEE Journal of Selected Topics in Quantum Electronics, vol. 20, Issue No. 6, Nov./Dec. 2014. [online] URL: <https://ieeexplore.ieee.org/document/6843869>.

T. Al Abbas, et al., "Backside Illuminated SPAD Image Sensor with 7.83μm Pitch in 3D-Stacked CMOS Technology", 2016 IEEE International Electron Devices Meeting (IEDM), San Francisco, CA., Dec. 3-7, 2016. [online] URL: <https://ieeexplore.ieee.org/document/7838372>.

Ryan E. Warburton, et al., "Ge-on-Si Single-Photon Avalanche Diode Detectors: Design, Modeling, Fabrication, and Characterization at Wavelengths 1310 and 1550 nm", IEEE Transactions on Electron Devices, vol. 60, Issue No. 11, Nov. 2013, pp. 3807-3813, [online] URL: <https://ieeexplore.ieee.org/stamp/stamp.jsp?arnumber=6620943>.

N. Na, et al., "Proposal and Demonslialion of Lock-In Pixels for Indirect Time-of-Flight Measurements based on Germanium-on-Silicon Technology", Artilux Inc., 8F-1 No. 6, Zhubei City, Hsinchu County, Taiwan.

\* cited by examiner

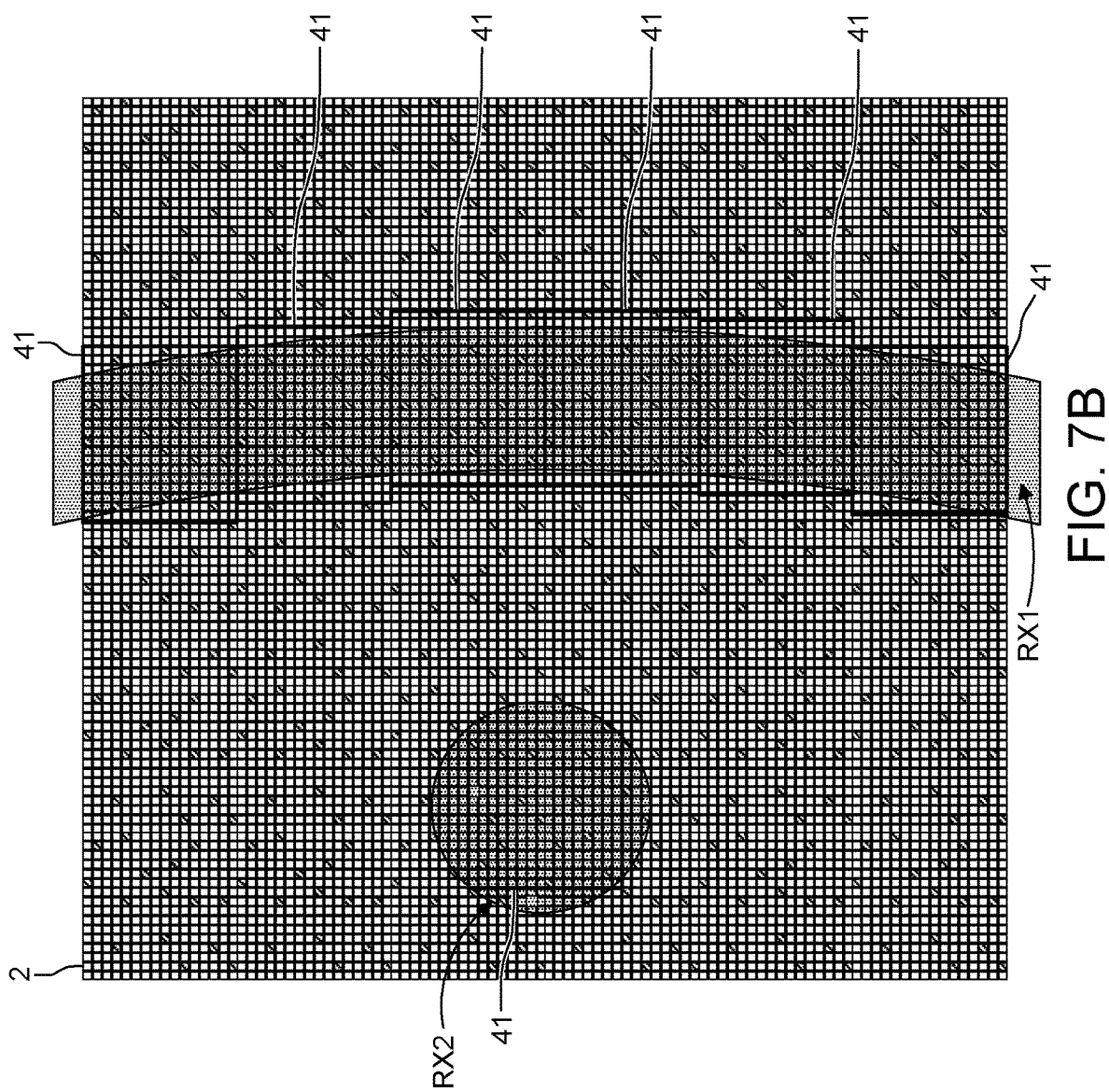

ARRAY OF SINGLE-PHOTON AVALANCHE DIODE (SPAD) MICROCELLS AND OPERATING THE SAME

FIELD

The present disclosure relates generally to photodetector arrays, and, more particularly, to an array of single-photon avalanche diode (SPAD) microcells.

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (ToF). LIDAR systems form depth measurements and make distance measurements by mapping the distance to objects based on the time-of-flight computations. Thus, the time-of-flight computations can create distance and depth maps, which may be used to generate images.

Photodetector arrays generate analog electrical signals that need to be converted into the digital domain in order to perform ToF measurements. For example, ADCs may be used for signal detection and ToF measurement. In this case, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm. In addition, prior to an ADC receiving an analog electrical signal, the electrical signal may pass through a transimpedance amplifier (TIA)) that converts the analog electrical signal from, for example, current into voltage. Thus, a LIDAR receiver using a typical photodetector array requires TIAs and ADCs for acquiring LIDAR sensor data and performing ToF measurements. This ultimately requires more power and leads to less precise measurements and slower response times.

Therefore, a digital photodetector array that can be used in LIDAR receiver systems may be desirable.

SUMMARY

One or more embodiments provide a digital light detector that includes a clock signal generator configured to generate a clock signal having clock pulses that are generated at a predetermined frequency; a single-photon avalanche diode (SPAD) configured to turn on and generate an avalanche current in response to receiving a photon, the SPAD including an anode terminal, a cathode terminal, and an internal capacitor coupled internally between the anode terminal and the cathode terminal; and an active quenching-recharging circuit that is triggered by the clock signal. The active quenching-recharging circuit is configured to be activated and deactivated based on the clock signal, where the active quenching-recharging circuit is configured to recharge the internal capacitor on a condition the active quenching-recharging circuit is activated, and where the active quenching-recharging circuit is configured to discharge the internal capacitor on a condition the active quenching-recharging circuit is deactivated.

One or more embodiments provide a method of operating a digital light detector. The method includes providing a bias voltage potential; generating a clock signal having clock pulses that are generated at a predetermined frequency; turning on a single-photon avalanche diode (SPAD) and generating an avalanche current in response to receiving a photon, wherein the SPAD includes an anode terminal, a cathode terminal, and an internal capacitor coupled internally between the anode terminal and the cathode terminal; controlling a activation state of an active quenching-recharging circuit based on the clock signal; charging the internal capacitor on a condition the active quenching-recharging circuit is activated; and discharging the internal capacitor on a condition the active quenching-recharging circuit is deactivated.

One or more embodiments provide a digital silicon photomultiplier (SiPM) device that includes a clock signal generator configured to generate a clock signal having clock pulses that are generated at a predetermined frequency; and an array of microcells. Each microcell includes: a single-photon avalanche diode (SPAD) configured to turn on and generate an avalanche current in response to receiving a photon, the SPAD including an anode terminal, a cathode terminal, and an internal capacitor coupled internally between the anode terminal and the cathode terminal; an active quenching-recharging circuit that is triggered by the clock signal, wherein the active quenching-recharging circuit is configured to be activated and deactivated based on the clock signal, wherein the active quenching-recharging circuit is configured to recharge the internal capacitor on a condition the active quenching-recharging circuit is activated, wherein the active quenching-recharging circuit is configured to discharge the internal capacitor on a condition the active quenching-recharging circuit is deactivated; and a digital output configured to output a digital value corresponding to a potential generated at an output node of the active quenching-recharging circuit. The digital SiPM device further includes a summing circuit configured to receive digital values from the array of microcells and generate a digital pixel value for the SiPM based on a sum of the digital values.

One or more embodiments provide a method of synchronously operating a plurality of single-photon avalanche diodes (SPADs) of a digital silicon photomultiplier (SiPM). The method includes providing a bias voltage potential; generating a clock signal having clock pulses that are generated at a predetermined frequency; providing the clock signal to a plurality of microcells of the digital SiPM, wherein each of the plurality of microcells includes a corresponding SPAD of the plurality of SPADs and a corresponding active quenching-recharging circuit that is triggered by the clock signal; controlling an activation state of each active quenching-recharging circuit based on the clock signal; charging an internal capacitor of a corresponding SPAD of the plurality of SPADs on a condition the corresponding active quenching-recharging circuit is activated; and discharging an internal capacitor of a corresponding SPAD of the plurality of SPADs on a condition the corresponding active quenching-recharging circuit is deactivated.

One or more embodiments provide a system configured to flexibly configure at least one silicon photomultiplier (SiPM). The system includes an array of microcells, each including: a single-photon avalanche diode (SPAD) configured to turn on and generate an avalanche current in response to receiving a photon, the SPAD including an anode terminal, a cathode terminal, and an internal capacitor coupled internally between the anode terminal and the cathode terminal; an active quenching-recharging circuit that is triggered by the clock signal, wherein the active quenching-recharging circuit is configured to be activated and deactivated based on the clock signal, wherein the active quenching-recharging circuit is configured to recharge the internal capacitor on a condition the active quenching-recharging circuit is activated, wherein the active quenching-recharging circuit is configured to discharge the internal capacitor on a condition the active quenching-recharging circuit is deactivated; and a digital output configured to output a digital value corresponding to a potential generated at an output node of the active quenching-recharging circuit. The system further includes a controller configured to dynamically group a portion of microcells of the array of microcells to form a SiPM.

BRIEF DESCRIPTION OF THE DRAWINGS

Embodiments are described herein making reference to the appended drawings.

FIGS. 7A and 7B illustrates a concept of a configurable digital SiPM according to one or more embodiments.

DETAILED DESCRIPTION

Figure 1:
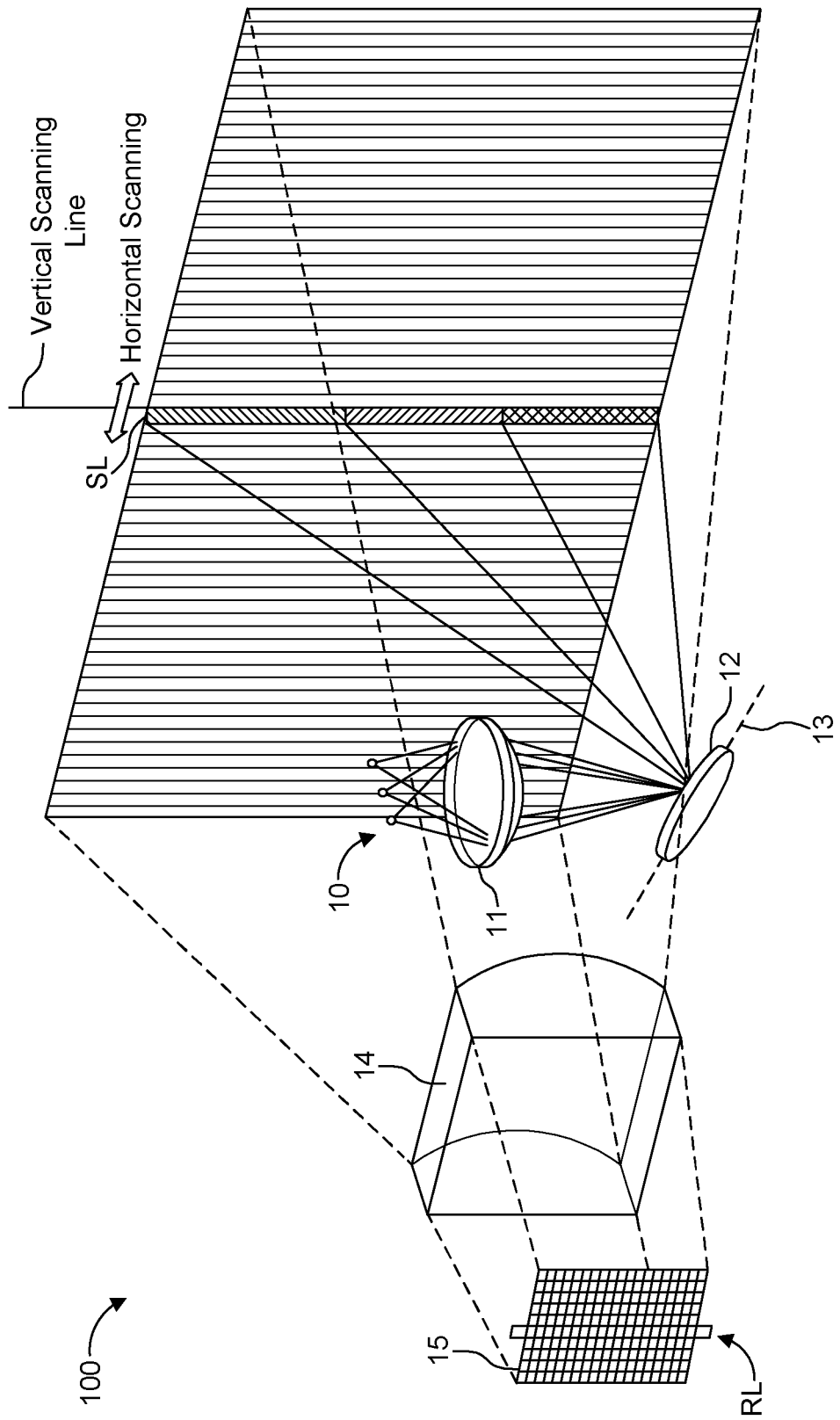
FIG. 1 is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Currently, a photodetector array may be used to measure the reflected light. The photodetector array may be a one-dimensional (1D) array that consists of multiple rows of photodetectors (pixels) arranged in a single column or a two-dimensional (2D) array that consists of multiple rows and columns of photodetectors arranged in a grid-like arrangement. Each pixel row or group of adjacent pixel rows may be readout as a measurement signal in the form of raw digital data. Each measurement signal may include data from a single pixel column or from two or more pixel columns corresponding to the selected pixel row or rows.

Differences in return times for each light pulse across multiple pixels of the pixel array can then be used to make digital 3D representations of an environment or to generate other sensor data. For example, the light source may emit a single light pulse, and a receiver circuit electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15 but may alternatively be a 1D photodetector array. The receiver may further include receiver circuitry, such as data acquisition/readout circuitry and data processing circuitry, as will be further described according to FIG. 2.

While this arrangement represents one example of a type of LIDAR system, it will be appreciated that other types of LIDAR systems, such as those used in flash LIDAR, may also be used. In addition, the LIDAR scanning system 100 may be rotated to scan in a different scanning direction. For example, the LIDAR scanning system 100 may be rotated 90° to scan in the vertical direction instead of the horizontal direction. Thus, the embodiments described herein are not limited to a particular type of light transmitter or TOF system and may be also applied to other types of TOF systems.

Turning back to FIG. 1, the photodetector array 15, whether it be a 2D array or a 1D array, is arranged in such a manner that an intended field of view is mapped vertically on the vertical extension of the photodetector array 15. A received light beam will hit only a specific row or group or rows of the detector array depending on the vertical angle of the received light beam. The intended field of view may be further mapped horizontally on the horizontal extension of a 2D photodetector array.

The photodetector array 15 is a digital photodetector array (i.e., an array of digital silicon photomultipliers). The digital photodetector array includes an array of digital silicon photomultipliers (SiPMs). Each SiPM comprises a plurality of microcells, each microcell comprising a single-photon avalanche diode (SPAD). Thus, each SiPM comprises an array of SPADs.

A single-photon avalanche diode (SPAD) is a solid-state photodetector in which a photon-generated carrier (via the internal photoelectric effect) can trigger a short-duration but relatively large avalanche current. This avalanche is created through a mechanism called impact ionization, whereby carriers (electrons and/or holes) are accelerated to high kinetic energies through a large potential gradient (voltage). If the kinetic energy of a carrier is sufficient (as a function of the ionization energy of the bulk material) further carriers are liberated from the atomic lattice. The number of carriers thus increases exponentially from, in some cases, as few as a single carrier. As a result, a SPAD is a photodiode operated above breakdown, where each detected photon results in an avalanche and, consequently, each detected photon can be counted.

SPADs, like avalanche photodiodes (APDs), exploit the incident radiation triggered avalanche current of a p-n junction when reverse biased. The fundamental difference between SPADs and APDs is that SPADs are specifically designed to operate with a reverse-bias voltage well above its breakdown voltage. This kind of operation is also called Geiger-mode (as opposed to the linear-mode for the case of an APD). This is in analogy with a Geiger counter.

In this example, the illumination unit 10 includes three light sources (e.g., laser diodes or light emitting diodes) that are linearly aligned in single bar formation and are configured to transmit light used for scanning the field of view for objects. The light emitted by the light sources is typically infrared light although light with another wavelength might also be used. As can be seen in the embodiment of FIG. 1, the shape of the light emitted by the light sources is spread in a direction perpendicular to the transmission direction to form a light beam with an oblong shape perpendicular to a transmission direction. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams. As can be seen from FIG. 1, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example, the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner. It will be appreciated that 2D MEMS mirrors, that oscillate about two orthogonal scanning axes, may also be used. Typically, a 1D MEMS mirror transmits a scanning line of laser light into the field-of-view. In contrast, a 2D MEMS mirror transmits a scanning spot of laser light into the field-of-view.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans.

While the transmission mirror is described in the context of a MEMS mirror, it will be appreciated that other 1D mirrors or even 2D mirrors can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis. LIDAR systems using 1D-scanning mirrors can use a more relaxed shot-rate of the illumination unit 10 (i.e., transmitter) compared to 2D-scanning mirrors which use laser points for scanning the field of view which requires more shots for the transmitter to scan a field of view. In addition, LIDAR systems using 1D-scanning mirrors are typically more robust against shock and vibrations when compared to 2D-scanning mirrors and are therefore well suited for automotive applications.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. The photodetector array 15 generates digital measurement signal based on received light. The digital measurement signals may be used for generating a 3D map of the environment and/or other object data based on the reflected light (e.g., via TOF calculations and processing).

The receiving line RL is shown as a vertical column of light that extends along one of the pixel columns in a lengthwise direction of the pixel column. The receiving line has three vertical regions that correspond to the vertical regions of the vertical scanning line SL shown in FIG. 1. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

In a system that uses a 1D photodetector array instead of a 2D photodetector array, each light beam (i.e., each receiving line RL) is projected onto the column of the detector array.

The photodetector array 15 is made up of an array of silicon photomultipliers (SiPMs). Each SiPM may be referred to as a SiPM pixel or a SiPM cell. Each SiPM includes multiple microcells (i.e., SPAD cells), with each microcell including a SPAD. In the examples provided herein, the photodetector array 15 is a two-dimensional (2D) SiPMs array that comprises an array of SiPM pixels. As noted above, the photodetector array 15 may be a 1D array that includes a single column of photodiodes. The activation of the photodiodes may be synchronized with light pulses emitted by the illumination unit 10.

The photodetector array 15 receives reflective light pulses as the receiving line RL and generates digital electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by one or more receiving photodiodes of the photodetector array 15. Each receiving photodiode emits a short electrical pulse that is read out by the readout circuit.

A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror 12, an area (i.e., a field of view) can be scanned, a three-dimensional image can be generated, and objects within the area can be detected.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a vertical column of light that may, for example, have the width of one photodetector pixel and a length that spans vertically at least partially along a pixel column of the photodetector array 15 in a lengthwise direction. That is, all photodetector pixels in a pixel column or a portion of the photodetector pixels of the pixel column may receive the bar of light. For example, in one instance, all light sources of the illumination unit 10 may be used to generate the scanning line SL/receiving line RL. In this case, the receiving line RL may extend along a full pixel column in the lengthwise direction. In another instance, only a subset of the light sources may be used to generate the scanning line SL/receiving line RL. In this case, the receiving line may extend along only a portion of the pixel column in the lengthwise direction.

In some instances, two or more pixel columns may receive light from a same bar of light. For example, two pixel columns may receive light when a portion of the received bar of light impinges on an area between two photodetector pixels. In this case, two pixel columns may be partially illuminated by a single bar of light in the width direction.

On the other hand, if a partial vertical scanning line SL is generated by the illumination unit 10, as described above, then only a partial pixel column of the photodetector array 15 may be illuminated in a lengthwise direction.

The photodetector array 15 is configured to generate digital measurement signals (electrical signals) used for generating a 3D map of the environment based on the reflected light (e.g., via TOF calculations and processing).

Figure 2:
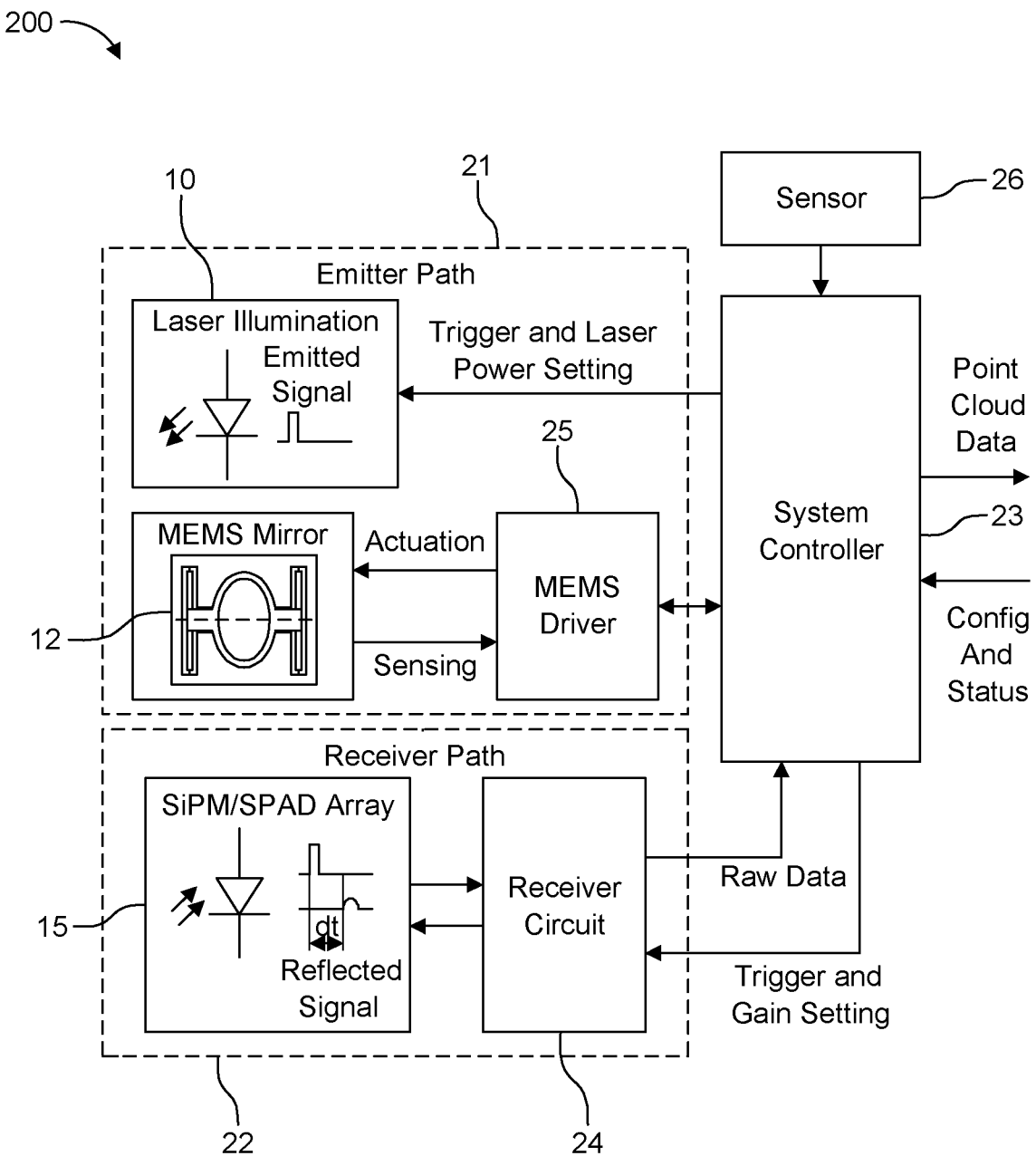
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw digital data from the receiver unit 22 and perform processing thereon (e.g., via digital signal processing) for generating object data (e.g., point cloud data). Thus, the system controller 23 includes at least one processor and/or processor circuitry (e.g., comparators and digital signal processors (DSPs)) of a signal processing chain for processing data, as well as control circuitry, such as a microcontroller, that is configured to generate control signals. The LIDAR scanning system 200 may also include a sensor 26, such as a temperature sensor, that provides sensor information to the system controller 23.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The receiver unit 22 includes the photodetector array 15 as well as a receiver circuit 24 that includes a digital readout circuit. As will be described in more detail below, a SiPM cell of the photodetector array 15 may be coupled to a readout channel of the receiver circuit 24, which receives the electrical signals therefrom. Additionally, each row of the photodetector array 15 may be selectively coupled and decoupled by a multiplexer to the receiver circuit 24. A pixel, a row, or a column that is coupled to the receiver circuit 24 may be referred to as active, while a pixel, a row, or a column that is not coupled to the receiver circuit 24 may be referred to as inactive.

The readout circuit includes N output channels (e.g., 32 channels) configured to read out measurement signals received from a selected pixel of a coupled row of the photodetector array 15. Furthermore, more than one pixel from a coupled row may be selected, multiple rows may simultaneously be coupled to an output channel, and one or more pixels may be selected from each coupled row. One acquisition of digital data from the photodetector array 15 on an output channel may be referred to as a digital sample, and each output channel may be used to acquire different digital samples. Each sample further corresponds to a sample time, at which time measurement signals are read out from one or more pixels.

Thus, the receiver circuit 24 may receive the digital electrical signals from the photodetectors of the photodetector array 15 and transmit the electrical signals as raw digital data to the system controller 23 for ToF measurement and generation of object data (e.g., 3D point cloud data).

The receiver circuit 24 may also receive trigger control signals from the system controller 23 that triggers an activation of one or more microcells, or conversely disables one or more microcells. Thus, the system controller 23 may control which SPADs are enabled and which are disabled. The readout circuit 24, in turn, may be configured to activate or deactivate particular SPADs of the photodetector array 15. The receiver circuit 24 may also receive gain setting control signals for controlling the gain of one or more photodetectors.

Figure 3A:
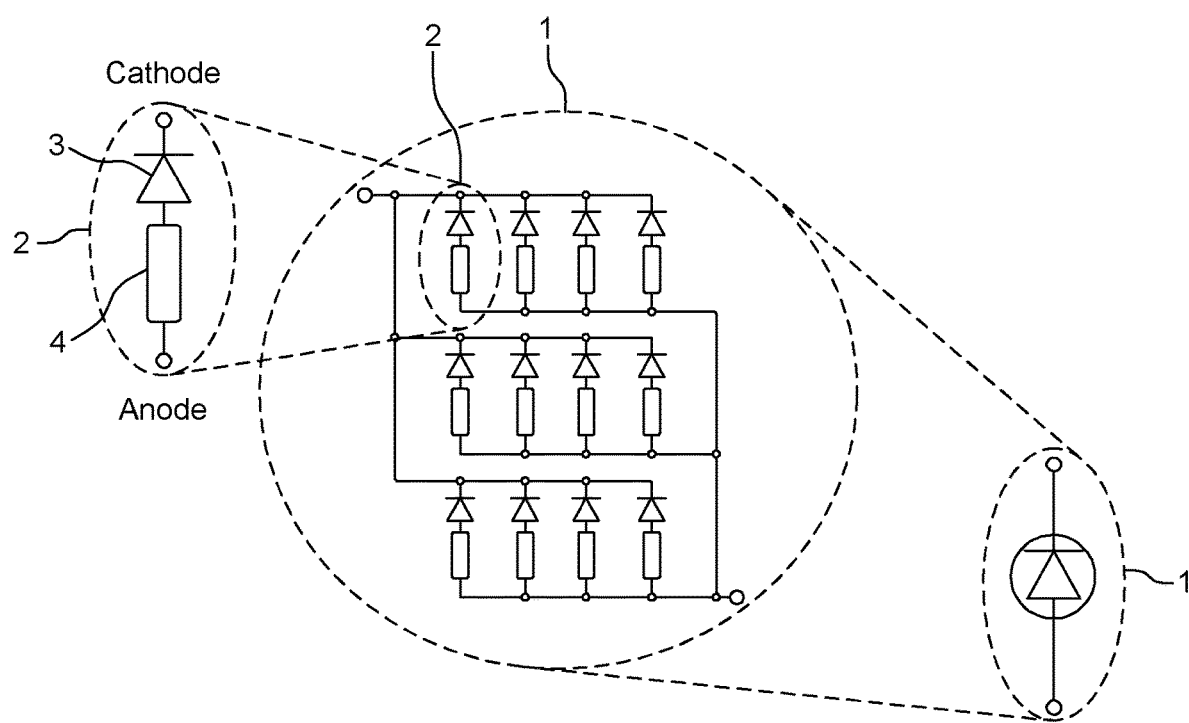
FIG. 3A is a schematic diagram of a digital SiPM pixel (i.e., a 2D SiPM pixel) according to one or more embodiments.
Figure 3B:
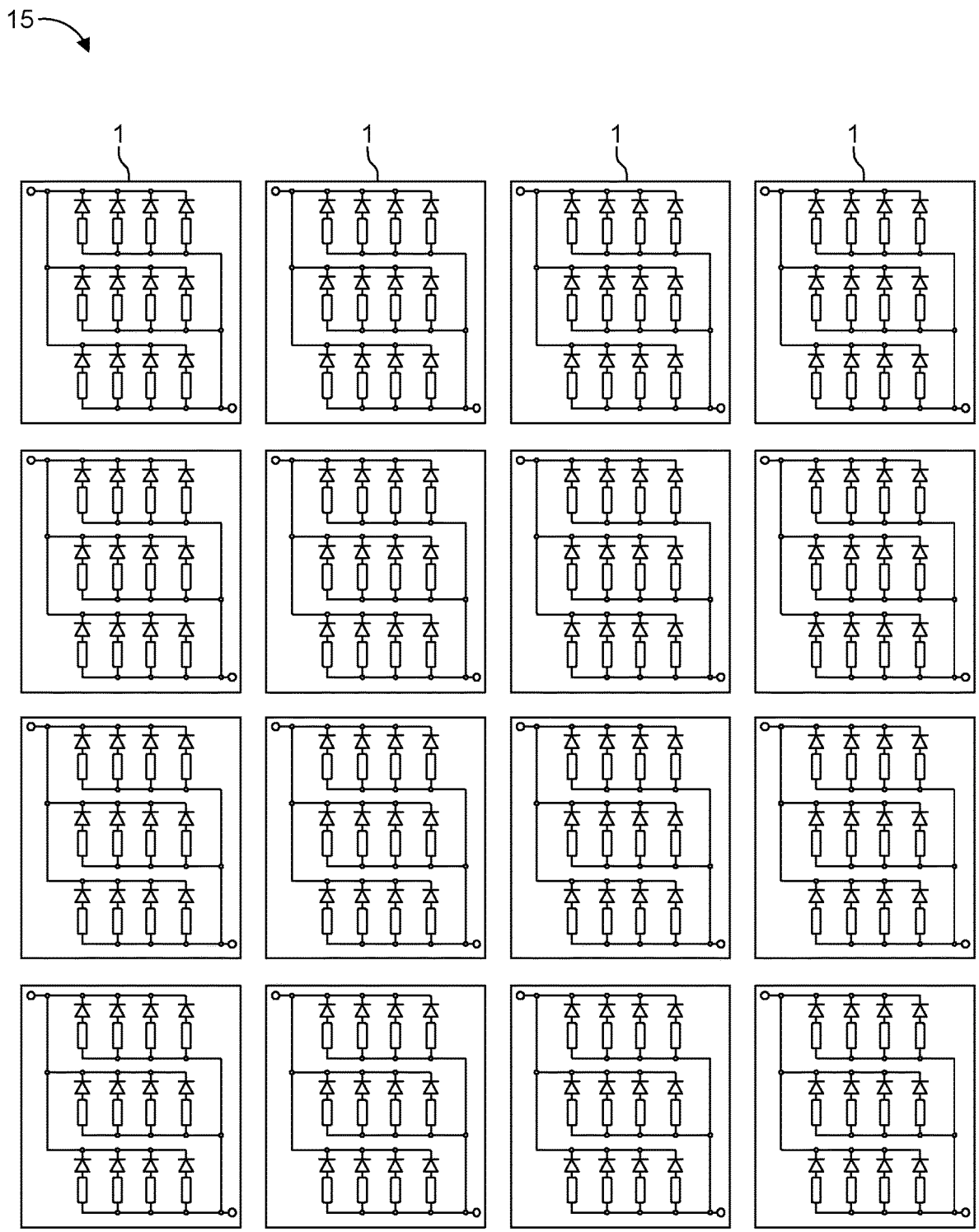
FIG. 3B is a schematic diagram of a 2D SiPM pixel array according to one or more embodiments.

FIG. 3A is a schematic diagram of a digital SiPM pixel 1 (i.e., a 2D SiPM pixel) according to one or more embodiments. FIG. 3B is a schematic diagram of a 2D SiPM pixel array according to one or more embodiments.

In particular, the photodetector array 15 is made up of an array of digital SiPM pixels 1 arranged into rows and columns. The digital SiPM pixel 1 includes an array of microcells 2, each of which includes a SPAD 3 in series with a quenching circuit 4 that includes a transistor $S_R$. As will be described in more detail below, the transistor $S_R$ behaves like a digital switch with a on resistance Ron. Thus, each SiPM pixel comprises an array of SPADs. In other words, a single SiPM pixel may be referred to as a SPAD array and each SPAD may be referred to as a SPAD pixel.

Every SPAD is inherently a binary device—either a photon has struck it or it has not. Upon receiving a photon, a SPAD 3 generates an electrical pulse. The intensity of the signal generated by a SiPM is obtained by counting (photon counting) the number of output pulses generated by its active SPADs within a measurement time slot, or by detecting cumulative current of all SPADs not resolving each photon event, while the time-dependent waveform of the signal is obtained by measuring the time distribution of the output signal (photon timing). The latter may be obtained by means of operating the SPAD detector in time-correlated single photon counting (TCSPC).

In particular, a SPAD is a solid-state photodetector in which a photon-generated carrier (via the internal photoelectric effect) can trigger a short-duration but relatively large avalanche current. This avalanche is created through a mechanism called impact ionization, whereby carriers (electrons and/or holes) are accelerated to high kinetic energies through a large potential gradient (voltage). If the kinetic energy of a carrier is sufficient (as a function of the ionization energy of the bulk material) further carriers are liberated from the atomic lattice. The number of carriers thus increases exponentially from, in some cases, as few as a single carrier.

The avalanche current rises swiftly [sub-nanosecond risetime] to a macroscopic steady level in the milliampere range. If the primary carrier is photo-generated, the leading edge of the avalanche pulse marks [with picosecond time jitter] the arrival time of the detected photon. The current continues until the avalanche is quenched by lowering the bias voltage $V_{BIAS}$ stored by the internal capacitance down to or below breakdown voltage $V_{BD}$. The internal capacitance is a stray or parasitic capacitance of the SPAD and is represented by an internal capacitor $C_D$ in FIGS. 5A-5D.

When this occurs, the lower electric field is no longer able to accelerate carriers to impact-ionize with lattice atoms, therefore the current ceases. In order to be able to detect another photon, the bias voltage at the internal capacitance must be raised again (i.e., recharged) above the breakdown voltage. This recharging time results in the SPAD being blind or deactivated until the internal capacitance is recharged above the breakdown voltage. The circuit responsible for quenching the avalanche current and the subsequent recharging of the internal capacitance is referred to as a quenching circuit 4. The quenching circuit 4 is representative of an active quench and recharge circuit (i.e., an active quenching-recharging circuit) that is quench and recharge circuit, and may be a transistor or other circuitry that performs active quenching and recharging of the SPAD 3. An active quenching-recharging circuit is different from a passive quench and recharge circuit, comprised solely of passive components such as a resistor that is not actively triggered.

This operation requires a suitable circuit, which senses the leading edge of the avalanche current, generates a standard output pulse synchronous with the avalanche build-up, quenches the avalanche by lowering the bias down to or below the breakdown voltage, and restores the photodiode to the operative level (i.e., to above the breakdown voltage).

By coupling a transistor $S_R$ in series with a SPAD 3, it becomes possible to build each microcell 2 as a digital sensor, thereby making the SiPM 1 an entirely digital sensor as a whole. As a result, the output of the SiPM 1 does not require an amplifier to amplify its generated signal and does not require an ADC to convert into the digital domain. It has very low noise (close to photon shot limit), and requires low power as no TIAs or ADCs are required.

Additionally, each SPAD may be selectively activated and deactivated. This can be done, for example, selectively coupling (activating) or decoupling (deactivating) a SPAD to an output of the SiPM or selectively activating or deactivating its respective quenching circuit so that the SPAD no longer recharges to an operational level. However, it will be appreciated that the activation and deactivation of a SPAD is not limited to these example techniques.

Additionally, array of SPADs may be a 1D array of SPADs or a 2D array of SPAD. For example, a SiPM pixel may include a 1D array of SPADs in which the SPADs are arranged in a single line (e.g., a single row of SPADs). This type of SiPM pixel may be referred to as a 1D SiPM pixel. Multiple 1D SiPM pixel, each with its own output coupled to a readout channel, may be used to create a 2D array of SPADs.

Alternatively, a SiPM pixel may include a 2D array of SPADs in which the SPADs are arranged in two directions forming multiple rows and columns. This type of SiPM pixel may be referred to as a 2D SiPM pixel. Each 2D SiPM pixel has its own output coupled to a readout channel. Regardless of being a 1D or 2D array, each SiPM pixel generates an electrical signal that is output to a corresponding readout channel that provides the electrical signal to a signal processing chain (not illustrated).

In the example shown in FIG. 3A, twelve microcells 2 are included. Thus, this SiPM 1 has twelve SPADs arranged in an array. The output of the SiPM pixel 1 is cumulative according to the electrical signals generated by the SPADs 3. For example, if only one SPAD in the array detects a photon during a measurement period, the output of the SiPM pixel may have an intensity I. On the other hand, if five SPADs in the array each detect a photon during a measurement period, the output of the SiPM pixel 1 may have an intensity 5I. If all SPADs in the array each detect a photon during a measurement period, the output of the SiPM pixel 1 may have an intensity 12I. As a result, the contributions of all SPADs 3 in the SiPM pixel 1 are added to generate the output signal. The number of SiPM pixels and the number of SPAD pixels within each SiPM pixel is entirely configurable.

Figure 4:
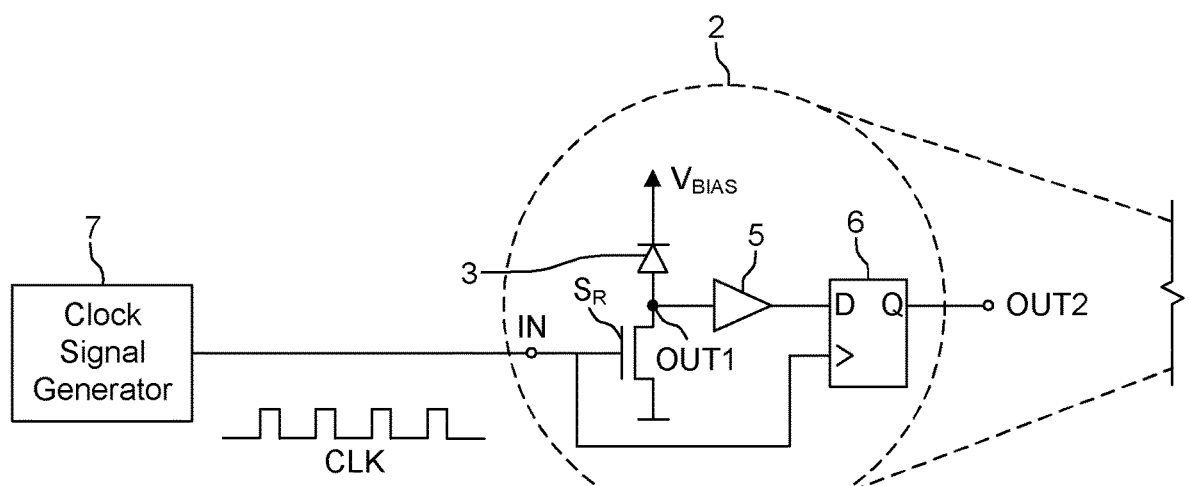
FIG. 4 illustrates a digital microcell configured with synchronous, active recharge according to one or more embodiments.

FIG. 4 illustrates a digital microcell configured with synchronous, active recharge according to one or more embodiments. In particular, the digital microcell 2 of FIG. 3A is provided in more detail. The digital microcell 2 includes a SPAD 3 and an active quenching-recharging circuit 4 that includes transistor $S_R$. In addition, a microcell read out circuit including a level shifter 5 and a 1-bit memory device 6 are provided. The 1-bit memory device 6 may be a clocked D flip-flop, for example.

The transistor $S_R$ includes configured to conduct a main current along a main current path between two conduction path terminal structures or conduction path electrodes (e.g., the source/emitter and the drain/collector) of the device. Further, the main current path may be controlled by means of a control electrode, sometimes referred to as gate electrode. Upon receiving a corresponding control signal from, e.g., a signal generator, the control electrode may set the transistor $S_R$ in one of a conducting state or a blocking state (i.e., on or off). A control signal may by a voltage signal or a current signal having a controlled value. For example, applying a positive input voltage signal across the gate and the source terminals will keep the device in its "ON" state, while making the input gate signal zero or slightly negative will cause it to turn "OFF".

While the transistor $S_R$ is shown to be arranged on at the low side of the SPAD (i.e., between the SPAD 3 and ground), it may also be arranged at the high side of the SPAD 3 (i.e., between the SPAD 3 and the bias voltage $V_{BIAS}$). The transistor $S_R$ is representative of an active quenching-recharging circuit that is triggered by a clock. When the transistor is turned off it quenches the SPAD 3 and when it is turned on it recharges the SPAD 3. It will be appreciated that the active quenching-recharging circuit that is triggered by a clock is not limited to a single transistor and may include one or more other circuit elements that performs an equivalent function of active quench and recharge based on a clock signal. It will also be appreciated that the active quenching-recharging circuit may or may not include a transistor.

The digital microcell 2 includes an input terminal IN (i.e., a control terminal of transistor $S_R$) coupled to a clock signal generator 7 (e.g., an oscillator) to receive a clock signal CLK. In this example, the clock signal is a 1 GHz signal but may be configurable based on the desired recharge time. Each microcell 2 in the SiPM 1 receives the same clock signal and includes a corresponding 1-bit memory device 6. Furthermore, each microcell in a SiPM array may receive the same clock signal and includes a corresponding 1-bit memory device 6.

The clock signal CLK actively turns the transistor $S_R$ on and off based on whether or not the SPAD 3 is in its operating mode (i.e., its off condition). When a SPAD 3 is in operating mode, it behaves like an open switch and is regarded as turned off. Thus, the node OUT1 that is coupled between the SPAD 3 and the transistor $S_R$ is pulled low (i.e., analog logic low). When a SPAD 3 receives a photon, the SPAD 3 behaves like a closed switch and turns on, pulling the node OUT1 high (i.e., analog logic high) to the bias voltage $V_{BIAS}$. The level shifter 5 receives the analog value from node OUT1 and translates the analog value into a corresponding digital value (i.e., digital logic low or digital logic high).

Depending on whether the active quenching-recharging circuit (e.g., the transistor $S_R$) is placed at the low side or the high side of the SPAD 3 and also depending on the particular implementation of the level shifter 5 (it could be inverting) the digital, binary signal for the SPAD/micro cell could be either 0 if no photon was detected and 1 if a photon was detected, or vice versa.

When the SPAD 3 is in its operating mode, the transistor $S_R$ remains off regardless of the value of the clock signal. On the other hand, after the internal capacitor $C_D$ (i.e., the stray or parasitic capacitance) of the SPAD 3 has been discharged due to a received photon and following a hold time, a clock pulse (e.g., a high clock value) turns on the transistor $S_R$ to charge the internal capacitor $C_D$ in order to place the SPAD 3 back into its operating mode.

In this example, the transistor $S_R$ may be an n-channel transistor. While the transistor $S_R$ is on, the internal capacitor $C_D$ of the SPAD 3 is capable of being recharged by the bias voltage $V_{BIAS}$ to above the breakdown voltage $V_{BD}$ of the SPAD 3. This recharge occurs if the internal capacitor $C_D$ has been discharged to be at or below the breakdown voltage $V_{BD}$. If the capacitor $C_D$ of the SPAD 3 is already charged to above the breakdown voltage $V_{BD}$, no recharge occurs since transistor $S_R$ remains off. Instead, the internal capacitor $C_D$ of the SPAD 3 remains above the breakdown voltage $V_{BD}$, awaiting to be triggered by a photon. Thus, the clock signal actively recharges the internal capacitor $C_D$ of the SPAD 3 after the internal capacitor $C_D$ has been discharged by a received photon.

In addition, since all microcells 2 receive the same clock signal CLK, the SPADs 3 are synchronously recharged on each clock cycle. By actively recharging the SPADs 3 synchronously, all SPADs are synchronously placed in their operating mode (i.e., their off condition). That is, those SPADs that have not been discharged are maintained in their operating mode and those SPADs that have been discharged by a photon since the previous clock cycle are recharged and brought back into their operating mode, ready to detect to another photon. As a result, an entire SiPM or an array of SiPMs can be actively and synchronously set into operating mode on every clock cycle.

Moreover, the transistor $S_R$ allows for a hold time between the internal capacitor $C_D$ of the SPAD 3 being discharged and subsequently recharged. The hold time allows for synchronous recharging among the SPADs. Without the hold time, the SPADs would be asynchronously recharged with respect to each other. For example, if a resistor were used in place of the transistor $S_R$, the SPAD would immediately enter the recharge phase after a photon hits the SPAD. As a result, SPADs will charge and discharge at different times based on received photons, leading to an analog signal being output that requires further signal processing, averaging, etc. In contrast, with synchronous recharging, a digital signal is generated because all SPADs are synchronously set in their operating mode, ready to be triggered by a photon. The measurement result of a SiPM per clock cycle is digitally cumulative signal of its SPADs.

Clock pulses of the clock signal CLK are configured to enable data captures by the 1-bit memory device 6. As a clocked D flip flop, the 1-bit memory device 6 is configured to capture a bit value transmitted by the level shifter 5 at each clock pulse (high clock value), and store and hold the captured bit value until the next clock cycle (or until change in the data value occurs). Thus, the bit value at output OUT2 is the bit value received from the level shifter 5, representative of the value at OUT1, that is captured as a result of a clock pulse received by the 1-bit memory device 6 at its clock input. The captured bit value is stored for a hold time until the next clock pulse that starts the next clock cycle.

The hold time allows any SPADs that have been discharged due to a received photon during a clock cycle to recharge and enter back into operation mode before the start of the next clock cycle. At the next clock cycle, the 1-bit memory device 6 follows the bit value received at its data input by capturing the bit value transmitted by the level shifter 5, which may be a new bit value or the same bit value as the previous clock cycle. The output OUT2 of the 1-bit memory device 6 transmits a digital signal as an output of the microcell 2.

According to this configuration, a digital sensor is formed without using amplifiers (e.g., TIAs) or ADCs, thereby providing a low power solution. Furthermore, the SPADs are recharged with a fixed, high-speed clock signal CLK with a short dead time and high time resolution.

FIGS. 5A-5D illustrate an active recharge cycle of a SPAD arranged in series with a transistor according to one or more embodiments. In particular, a cycle of four stages is shown, including (re)-charge stage in FIG. 5A, an operating mode (off-condition) stage in FIG. 5B, photon trigger (discharge) stage in FIG. 5C, and hold time stage in FIG. 5D.

FIGS. 5A-5D each show a schematic diagram of a SPAD 3 and transistor $S_R$ of the microcell 2 shown in FIGS. 3 and 4. The SPAD 3 is represented by an internal resistance RD, a breakdown voltage $V_{BD}$, a switch S, and an internal capacitance $C_D$ (i.e., parasitic capacitance). The transistor $S_R$ is represented by a switch SR and an internal on resistance Ron. Both the SPAD 3 and the transistor are coupled to opposite terminals of the bias voltage supply $V_{BIAS}$. In particular, the cathode of the SPAD 3 is connected to the negative terminal of the bias voltage supply $V_{BIAS}$ or a ground potential, and the transistor is coupled between the anode of the SPAD 3 and the positive terminal of the bias voltage supply $V_{BIAS}$.

Figure 5A:
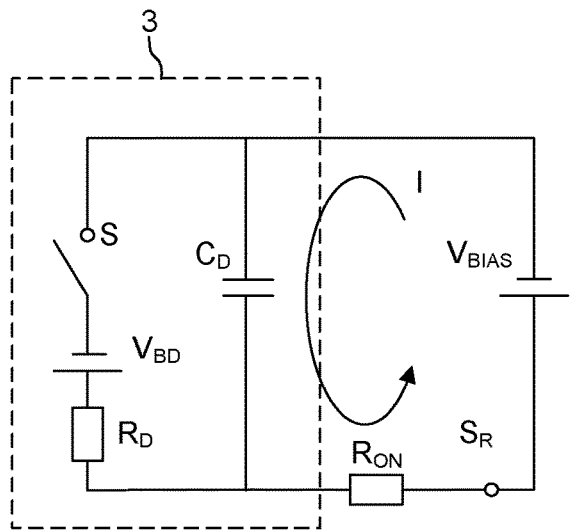
FIGS. 5A-5D illustrate an active recharge cycle of a SPAD arranged in series with a transistor according to one or more embodiments.

During the (re)-charge stage shown in FIG. 5A, transistor $S_R$ is turned on by a clock pulse of CLK and an electron current I flows through the internal capacitance $C_D$ to charge the internal capacitance to the bias voltage $V_{BIAS}$ through the transistor $S_R$, including the on resistance Ron. The SPAD 3 is off and, thus, the switch S is open. The time constant for charging the internal capacitance $C_D$ is represented by $C_D$*Ron. Once the internal capacitance $C_D$ is charged to the bias voltage $V_{BIAS}$, the SPAD 3 is considered in operating mode.

Figure 5B:
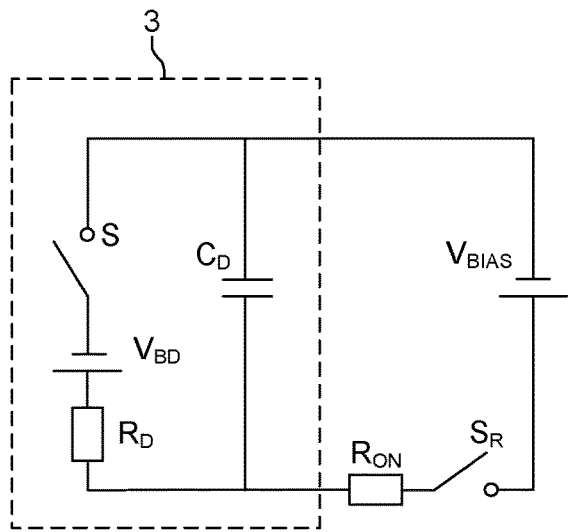

During the operating mode stage shown in FIG. 5B, the SPAD 3 remains off. Additionally, the transistor $S_R$ is also turned off. As a result, the internal capacitance $C_D$ holds the bias voltage $V_{BIAS}$ and no current flows through the circuit. The circuit remains in this operating mode (off-condition) until a photon is received and triggers an avalanche at the SPAD 3.

Figure 5C:
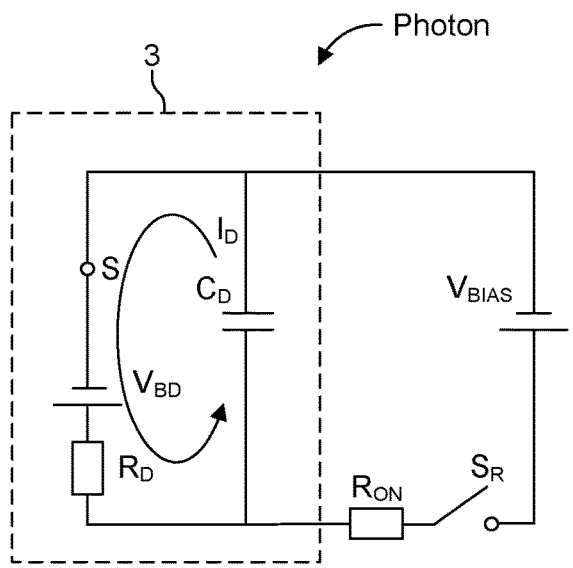

During the photon trigger (discharge) stage in FIG. 5C, the SPAD 3 is activated by the received photon and the switch S is closed. An avalanche current $I_D$ is generated by the closing of the switch S and the internal capacitance $C_D$ is discharged to the breakdown voltage $V_{BD}$ through the internal resistance $R_D$. The time constant for discharging the internal capacitance $C_D$ is represented by $C_D$*Ron. During this stage, the transistor $S_R$ remains off. Once the internal capacitance $C_D$ is discharged to the breakdown voltage $V_{BD}$, the SPAD is turned off resulting in the switch S being turned off (i.e., opened).

Figure 5D:
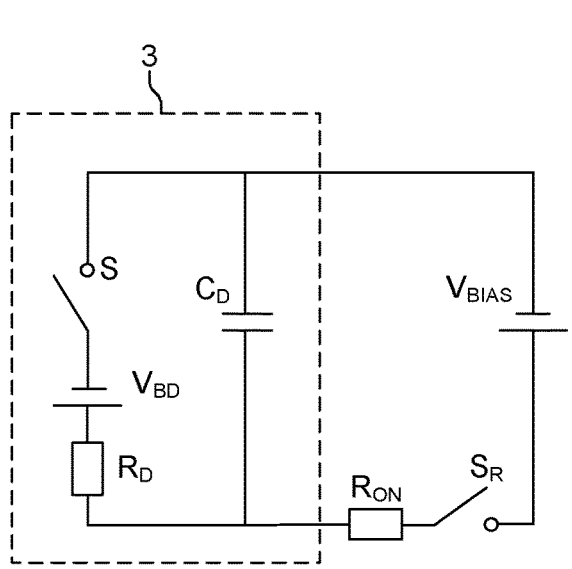

During the hold stage in FIG. 5D, a hold time is imposed by the clock signal CLK until the next clock pulse. The hold time is a period between a time the internal capacitance $C_D$ is discharged to the breakdown voltage $V_{BD}$ and a time the next clock pulse occurs. During the hold time, the SPAD 3 is non-conducting (i.e., switch S is off), the transistor $S_R$ is off (i.e., switch SR is off), the internal capacitance $C_D$ is held at the breakdown voltage $V_{BD}$, and no current flows through the circuit. At the next clock pulse, the transistor $S_R$ turns on as a result of receiving a high clock signal at its control terminal and the circuit enters the recharging stage shown in FIG. 5A. The cycle then repeats.

Figure 6:
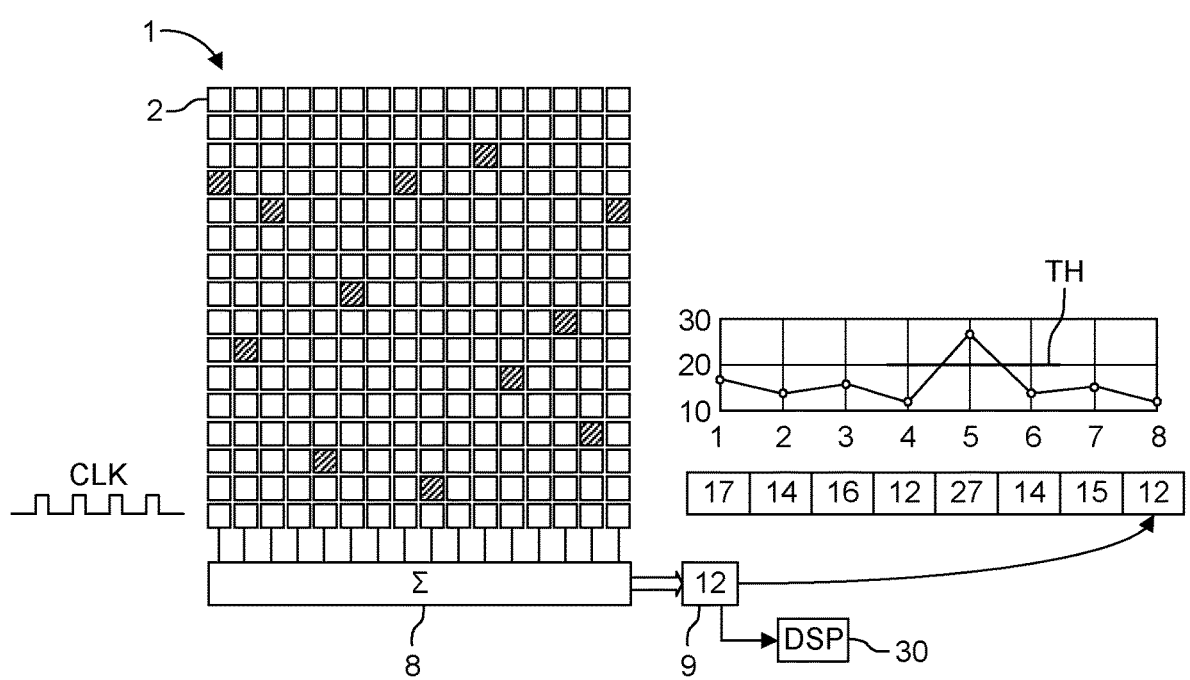
FIG. 6 is a schematic diagram of a digital sensor element according to one or more embodiments.

FIG. 6 is a schematic diagram of a digital sensor element according to one or more embodiments. The digital sensor element includes a SiPM 1 that comprises a 16×16 array of microcells 2, a summing circuit 8, and a register 9. Each microcell 2 is representative of a SPAD 3. In this example, each microcell column is electrically coupled to the summing circuit 8 via a corresponding readout channel for receiving a digital output therefrom. Alternatively, the summing circuit 8 may be electrically coupled to each microcell row via a corresponding readout channel for receiving one or more digital outputs therefrom. The summing circuit 8 sums the received digital outputs and transmits a summed value to the register 9 for each clock cycle of the clock signal CLK. For the clock cycle shown, an output value of 12 is provided to the register representing the 12 SPADs in the SiPM 1 that received a photon during that clock cycle. As a result, a time-series digital signal (i.e., a digital signal over time) shown on the right is generated that has a value for each clock cycle. Each value is a discrete value between 0 and the maximum value. In a 16×16 microcell array, the maximum discrete value is 256, for a total of 257 possible discrete signal levels per clock cycle.

By way of another example and referring back to FIG. 3A, if zero SPADs in the SiPM 1 detect a photon during a measurement period (e.g., during a clock cycle), the pixel value output by the SiPM 1 may have a value of 0, representing a minimum pixel value. If only one SPAD in the SiPM 1 detects a photon during a measurement period, the pixel value output by the SiPM 1 may have a value of 1. On the other hand, if five SPADs in the SiPM each detect a photon during a measurement period, the pixel value output by the SiPM 1 may have a value of 5. If all SPADs in the SiPM 1 each detect a photon during a measurement period, the pixel value output by the SiPM 1 may have a value of 12, representing a maximum pixel value.

Accordingly, the contributions of all SPADs in a SiPM 1 provided by their respective output OUT2 are added per clock cycle of the clock signal CLK by the summing circuit 8 to generate a summed digital value for the SiPM. This summed digital value is a pixel value that represents a sum of all the bit values generated by the SPAD for an individual SiPM 1. In an array of SiPMs, each SiPM outputs a pixel value per clock cycle that is used to generate an image.

A digital signal processor (DSP) 30 provided in the system controller 23 may further analyze the time-series digital signal and distinguish received laser photons from received ambient light photons (i.e., background light photons). More specifically, the DSP 30 may distinguish pixel values that correspond to received (backscattered) laser light from pixels values that only correspond to noise resulting from ambient light. The DSP 30 may do so by detecting a peak in the time-series digital signal that exceeds a predetermined threshold TH. A peak is indicative of a concentrated number of photons received at the SiPM, which typically occurs when backscattered laser light is received. Pixels values below the threshold TH typically indicate that backscattered laser light is not present, at least at an appreciable level, and are the result of ambient light.

Figure 7A:
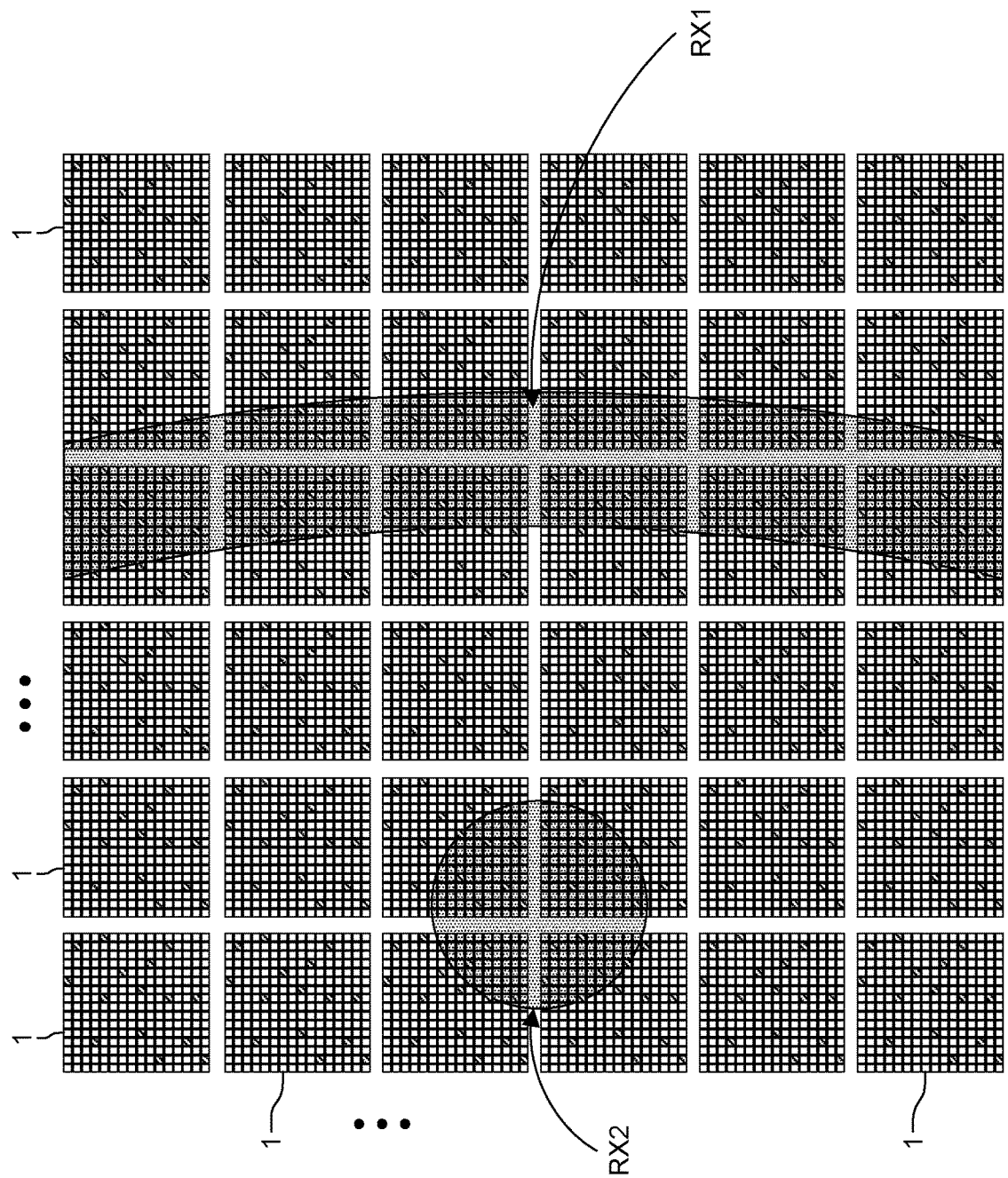

FIGS. 7A and 7B illustrates a concept of a configurable digital SiPM according to one or more embodiments. In this concept, SPADs are combined into arbitrary groups to create configurable digital SiPMs.

In FIG. 7A, a 6×6 array of digital SiPMs 1 is provided, with each SiPM 1 comprising a 16×16 array of microcells. In addition, two example backscattered laser beams RX1 and RX2 are shown.

Laser beam RX1 is a receiving line of received laser light formed in a 1D MEMS mirror scanner. The receiving line is curved due to non-ideal properties of the receiving optics. As a result, the laser beam RX1 is projected at least partially on twelve SiPMs arranged in all SiPM rows and two of the SiPM columns.

Laser beam RX2 is a receiving spot of received laser light formed in a 2D MEMS mirror scanner. The laser beam RX2 may be projected on one or more adjacent SiPMs. In this example, the laser beam RX2 is projected onto portions of four different SiPMs.

The location on the array at which the laser beams are expected to be received can be estimated by the system controller 23 based both on the transmission direction of the transmitted laser beam (i.e., a position of the MEMS mirror 12 about its one or two scanning axes) and the known properties of the receiver optics.

In either case, when using fixed SiPM configuration, its possible that multiple SiPMs only receive part of the laser signal. Accordingly, the adders of an adder circuit could be configured to add the digital pixel values of the target SiPMs where light is expected to be received while ignoring outputs from the SiPMs at which light is not expected to be received. Additionally, or alternatively, target SiPMs where light is expected to be received may be activated or enabled, while the remaining SiPMs may be deactivated or disabled. However, in a fixed SiPM configuration, the target SiPMs take up a larger area than is required to detect the laser signal.

Therefore, more ambient light is received at those pixels than necessary, resulting in more detected noise and a lower signal-to-noise ratio (SNR).

Alternatively, in FIG. 7B, the array can be employed as a 96×96 array of microcells that can be dynamically and flexibly grouped into digital SiPMs 41 based on a location of expected light. In this case, the SiPMs 41 are not fixed but are formed by grouping adjacent microcells together as desired during runtime of a scanning operation. The groupings of microcells may be done in a 16×16 manner or by using other array sizes. The groupings can be changed during a scanning operation as the backscattered light moves across the microcell array. That is, the grouping can move along with the received light beam across the entire microcell array. Furthermore, the groupings can be selected based on the shape of the backscattered light projected onto the array.

This can drastically improve the SNR as the area at which a backscattered laser signal is received can be maximized while minimizing the area at which the laser signal is not received. Not only may optimizing the use of SPADs in a flexible configuration aid in minimizing the influence of background light and minimizing power consumption, varying the pixel resolution is also possible by increasing or decreasing the sized of the SiPMs 41. Furthermore, cheaper optics with higher characteristic flaw may be used since the SiPMs 41 can be created to correct any distortion resultant from the non-ideal properties thereof. Furthermore, certain regions of the array can be disabled where the signal is too strong to improve the dynamic range.

The system controller 23 is configured to predict a region of the array at which backscattered laser light is to be received and identify the microcells 2 in the particular region of the array to be grouped into one or more SiPMs 41. The region may be predicted based on monitoring the transmission direction of the transmitted laser beam (i.e., a position of the MEMS mirror 12 about its one or two scanning axes) and the known properties of the receiver optics. The system controller 23 may enable the microcells 2 that are grouped into the one or more SiPMs 41, while disabling the microcells 2 that are outside of the one or more SiPMs 41 (i.e., outside of the predicted region). The configuration of enabled microcells and the formation of SiPMs 41 may be changed on a shot-per-shot basis as the transmitted laser beams are shot into the field-of-view in different transmission directions.

Additionally, or alternatively, the system controller 23 may reconfigure the adder circuit according to the groupings of microcells that form a SiPM 41 so that the adder circuit receives digital values from the groupings of microcells and adds them together to generate a pixel value for the formed SiPM 41. Thus, the system controller 23 may reconfigure the groupings of adders in the adder circuit to conform to each configured SiPM 41.

Thus, two grouping approaches include grouping adders the adder circuit or deactivating single microcells 2.

Grouping adders results in adding large numbers of bits using a hierarchical approach. For example, a naïve approach or a Wallace tree may be used. Here adder branches may be selected to focus on a particular rectangular area (i.e., an area of SiPM 41). Additional adder branches may be selected to focus on a second rectangular area corresponding to a second SiPM, and so on. This may be achieved by adding columns along rows, then adding rows along the array edge (or vice versa).

Deactivating microcells in areas that do not correspond to the target SiPMs 41 is another way of defining groups of active microcells that form one or more target SiPMs 41. This technique can be used to create one or more SiPMs or, conversely, deactivated microcell regions, of any arbitrary shape.

Figure 8:
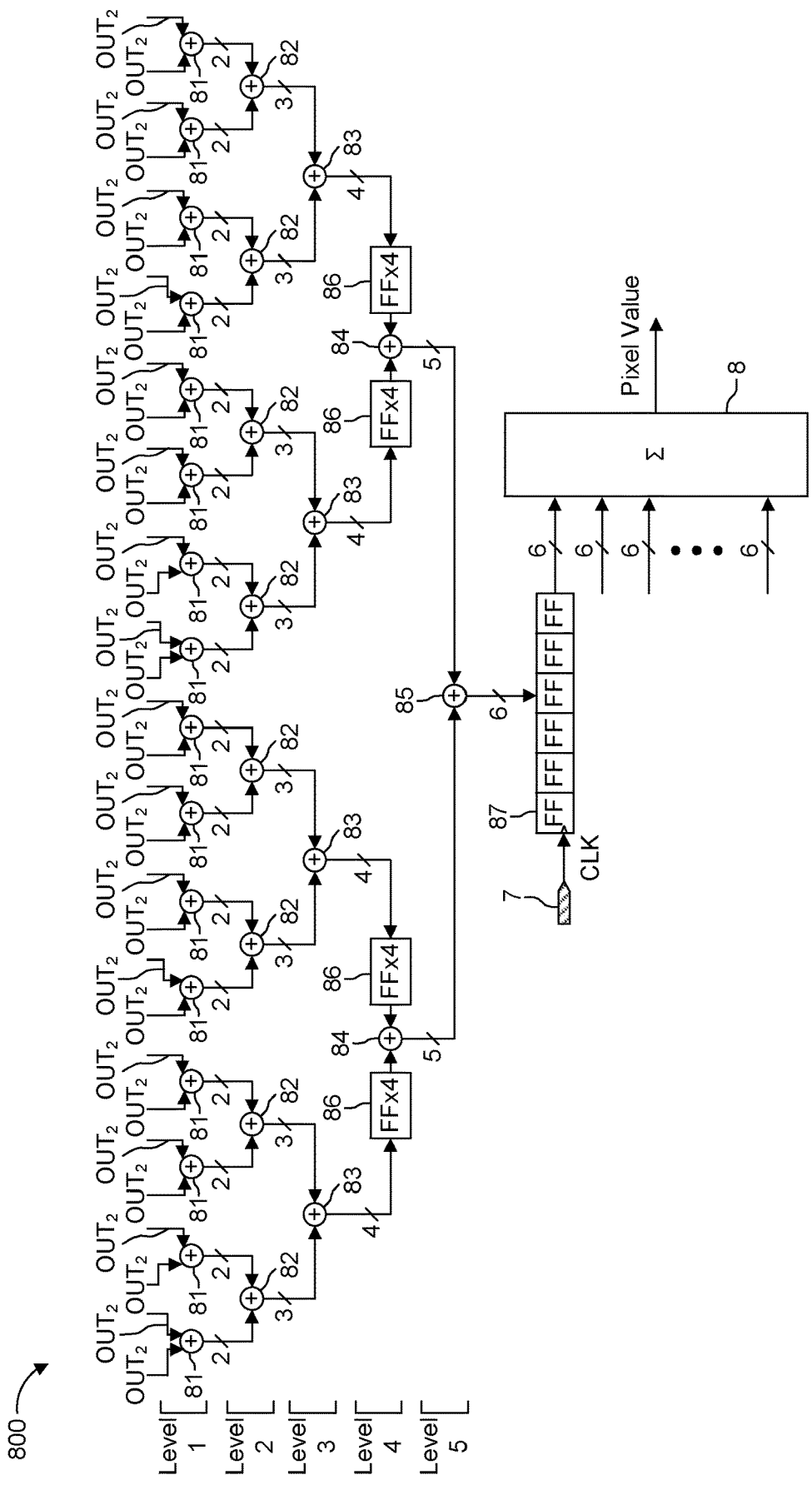
FIG. 8 is a schematic diagram of a hierarchical adder tree according to one or more embodiments.

FIG. 8 is a schematic diagram of a hierarchical adder tree 800 according to one or more embodiments. The hierarchical adder tree 800 includes five hierarchical levels of adders representative of the aforementioned adder circuit. The hierarchical adder tree 800 also includes a summing circuit 8 that receives an output of the adder circuit. The adder tree adds in total 32 bits but outputs 6 bits to represent the result.

The first level (level 1) comprises a first plurality of adders 81, each electrically coupled to an output OUT2 of a different adjacent pair of microcells. For example, sixteen adders 81 may be used when defining a SiPM 41 with thirty two microcells in a row. In this example, each adder 81 may be a half adder (HA) that generate a 2-bit output value.

In the second level (level 2), the hierarchical adder tree 800 comprises a second plurality of adders 82, each coupled to a different pair of adjacent adders 81. Adders 82 may each be formed using a full adder (FA) and a half adder, and generates a 3-bit output value.

In the third level (level 3), the hierarchical adder tree 800 comprises a third plurality of adders 83, each coupled to a different pair of adjacent adders 82. Adders 83 may each be formed using two full adders and a half adder, and generates a 4-bit output value.

In the fourth level (level 4), the hierarchical adder tree 800 comprises a fourth plurality of adders 84, each coupled to a different pair of adjacent adders 83. Adders 84 may each be formed using three full adders and a half adder, and generates a 5-bit output value. Additionally, four 1-bit flip flops (FF) 86 may be coupled between adders 83 and 84 for pipelining.

In the fifth level (level 5), the hierarchical adder tree 800 comprises a fifth adder 85, each coupled to a pair of adjacent adders 84. Adder 85 may be formed using four full adders and a half adder, and generates a 6-bit output value, which represents a digital value for the row of microcells of the SiPM 41. The 6-bit output value may be transmitted to a clocked memory device 87 that comprises six 1-bit flip flops. The six flip flops capture the 6-bit value output by adder 85 at every clock cycle of the clock signal CLK and outputs the 6-bit value to a summing circuit 8. The summer circuit 8 adds the 6-bit value received from each microcell row that defines the SiPM 41 to generate a pixel value for the SiPM 41.

Additional examples of one or more embodiments is provided.

A photodetector array includes an array of SiPMs, wherein each SiPM comprises a plurality of microcells, each microcell comprising a SPAD. The plurality of microcells cells may be grouped into one or more SiPM pixels, where the grouping into SiPM pixels can be: flexible (via a configuration file or control signals); continuous (i.e., a SiPM pixel may comprise a group of microcells that are geometrically contiguous); discontinuous (i.e., a SiPM pixel may comprise two or more groups of microcells that are geometrically separated or non-contiguous to each other), may include non-detecting microcells that are intentionally made blind or non-biased, the plurality of microcells are configured to be dynamically grouped into a plurality of SiPM pixels, and/or the one or more SiPMs may be created quickly, between clock cycles, and re-configurable "on-the-fly".

In addition, a global reset can be applied to the entire array of microcells or to a portion of the array of microcells.

In addition, photon counting can be started synchronously.

In addition, a number of photon counts in a SiPM pixel during a time between two sequential resets can be done digitally.

In view of the above, each pixel is configured to record the time series of the incoming light signal with very high timing resolution. With an analog photo detector this requires a very fast ADC. Since the distance to the target is determined by the arrival time of the pulse, the timing resolution directly determines the distance resolution. Typical required timing resolutions are in the order of 1 ns, resulting in a sampling rate of an ADC of around 1 GHz.

According to one or more embodiments, all SPADs are run (i.e., are active) in synchrony. Once per clock cycle, the result of the photo detection at each SPAD is stored in a corresponding D flip flop and the SPAD is recharged. All active SPADs do this at the same time. Likewise, the summation of the individual bits of the SPADs is done at this clock rate. The result of this is obtaining a very fast stream of values from each of the pixels, in fact one value every nanosecond.

According to one or more embodiments, the SPADs are freely grouped (i.e., on a dynamic basis) as a configurable digital SiPM to effectively define "pixels" on the fly. These "pixels" are not limited to a fixed raster but can vary in size, shape, and location in the SPAD array. This allows the sensor to more precisely match the pixels to the shape and expected location of the light pulses. It is also possible to flexibly increase or reduce the resolution by reducing or increasing the size of the "pixels". As demonstrated in FIGS. 7A and 7B, this works both for 2D scanning LIDAR where round light spots are received at the pixel array, as well as 1D LIDAR working with entire receiving lines. In the latter case it is most evident: the line is subdivided on the microcell array into individual pixels. Since the location of the "pixels" can vary freely, the sensor can also compensate for distortion by the optics, allowing the use of cheaper lenses.

Effectively, only a small portion of the microcell array may be active at any given time. This reduces power consumption, but equally important it also reduces the amount of data being transferred. It would not be possible to transfer data from the entire array at 1 GHz off the chip. For example, in a 1D LIDAR sensor using vertical lines it may only be possible to transfer data from 32 pixels at the same time.

It is further noted that noise and range, TIAs, ADCs, and power consumption are all major pain points of current APD solutions, all of which may be improved or eliminated by the present embodiments.

Although embodiments described herein relate to a LIDAR system, it is to be understood that the SiPM may be used in other applications. Thus, the SiPM and the digital photodetector array as a whole is note limited to LIDAR.

In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:
1. A digital light detector, comprising:
a clock signal generator configured to generate a clock signal comprised of clock pulses that are generated at a predetermined frequency;
a single-photon avalanche diode (SPAD) configured to turn on and generate an avalanche current in response to receiving a photon, the SPAD comprising an anode terminal, a cathode terminal, and an internal capacitor coupled internally between the anode terminal and the cathode terminal;
an active quenching-recharging circuit that is triggered by the clock signal, wherein the active quenching-recharging circuit is configured to be activated and deactivated based on the clock signal, wherein the active quenching-recharging circuit comprises an output node and a control terminal coupled to the clock signal generator, wherein the control terminal is configured to receive the clock signal to actively charge the internal capacitor based on a charging condition being satisfied,
wherein the charging condition is satisfied on a condition that a clock pulse of the clock signal is received while the internal capacitor is in a discharged state;
a level shifter coupled to the output node and configured to convert an output potential at the output node to a digital value; and
a clocked 1-bit memory device configured to receive the clock signal from the clock signal generator, receive the digital value from the level shifter, and output the digital value at each clock pulse of the clock signal on a per clock cycle basis,
wherein the active quenching-recharging circuit is configured to recharge the internal capacitor on a condition the active quenching-recharging circuit is activated, and wherein the active quenching-recharging circuit is configured to discharge the internal capacitor on a condition the active quenching-recharging circuit is deactivated.

2. The digital light detector of claim 1, wherein:
the active quenching-recharging circuit includes a transistor coupled in series with the SPAD, and
the transistor comprises the control terminal.

3. The digital light detector of claim 2, wherein the transistor is coupled to the SPAD at the output node.

4. The digital light detector of claim 1, wherein the internal capacitor is discharged in response to the SPAD receiving the photon.

5. The digital light detector of claim 1, wherein the internal capacitor is in the discharged state when a capacitor voltage of the internal capacitor is less than a bias voltage potential.

6. The digital light detector of claim 5, wherein:
the SPAD has a breakdown voltage that is less than the bias voltage potential, and
the internal capacitor is in the discharged state when a capacitor voltage of the internal capacitor is equal to or less than the breakdown voltage.

7. The digital light detector of claim 5, wherein:
the active quenching-recharging circuit is configured to turn on in response to the charging condition being satisfied, thereby charging the internal capacitor to the bias voltage potential, and
the active quenching-recharging circuit is configured to turn off in response to the internal capacitor being charged to the bias voltage potential and remains off until the charging condition is re-satisfied.

8. The digital light detector of claim 7, wherein the SPAD is configured to turn off in response to the internal capacitor discharging to the discharged state and remains off until receiving a further photon.

9. The digital light detector of claim 7, wherein:
the internal capacitor is discharged in response to the SPAD receiving the photon, and
the clock signal generator and the active quenching-recharging circuit impose a hold time between a time the internal capacitor is discharged to the discharged state and a time the charging condition is satisfied or re-satisfied before enabling a charging of the internal capacitor to the bias voltage potential.

10. The digital light detector of claim 1, wherein:
the SPAD and the active quenching-recharging circuit are configured to generate a first potential at the output node in response to the SPAD being turned on, and
the SPAD and the active quenching-recharging circuit are configured to generate a second potential at the output node in response to the SPAD being turned off.

11. The digital light detector of claim 10, wherein the SPAD is configured to turn off in response to the internal capacitor discharging to the discharged state and remains off until receiving a further photon.

12. The digital light detector of claim 1, wherein the internal capacitor is a stray capacitance or a parasitic capacitance of the SPAD.

13. A method of operating a digital light detector, the method comprising:
providing a bias voltage potential;
generating a clock signal comprised of clock pulses that are generated at a predetermined frequency;
turning on a single-photon avalanche diode (SPAD) and generating an avalanche current in response to receiving a photon, wherein the SPAD comprises an anode terminal, a cathode terminal, and an internal capacitor coupled internally between the anode terminal and the cathode terminal;
controlling an activation state of an active quenching-recharging circuit based on the clock signal received at a control terminal of the active quenching-recharging circuit;
charging the internal capacitor on a condition the active quenching-recharging circuit is activated;
discharging the internal capacitor on a condition the active quenching-recharging circuit is deactivated;
converting an output potential generated at an output node of the active quenching-recharging circuit to a digital value; and
outputting the digital value at each clock pulse of the clock signal on a per clock cycle basis,
wherein converting the output potential generated at the output node of the active quenching-recharging circuit to the digital value comprises level-shifting the output potential to the digital value by a level shifter, and
wherein outputting the digital value at each clock pulse of the clock signal on a per clock cycle basis comprises receiving, at a clocked 1-bit memory device, the clock signal from the clock signal generator and the digital value from the level shifter, and outputting, by the clocked 1-bit memory device, the digital value at each clock pulse of the clock signal on a per clock cycle basis.

14. The method of claim 13, wherein charging the internal capacitor further incudes satisfying a charging condition, wherein the charging condition is satisfied on a condition that a clock pulse of the clock signal is received while the internal capacitor is in a discharged state.

15. The method of claim 13, further comprising:
actively recharging the internal capacitor with the clock signal received at the control terminal based on a charging condition being satisfied, wherein the charging condition is satisfied on a condition that a clock pulse of the clock signal is received while the internal capacitor is in a discharged state.

16. A digital silicon photomultiplier (SiPM) device, comprising:
a clock signal generator configured to generate a clock signal comprised of clock pulses that are generated at a predetermined frequency;
an array of microcells, wherein each microcell comprises:
a single-photon avalanche diode (SPAD) configured to turn on and generate an avalanche current in response to receiving a photon, the SPAD comprising an anode terminal, a cathode terminal, and an internal capacitor coupled internally between the anode terminal and the cathode terminal;
an active quenching-recharging circuit that is triggered by the clock signal, wherein the active quenching-recharging circuit is configured to be activated and deactivated based on the clock signal,
wherein the active quenching-recharging circuit is configured to recharge the internal capacitor on a condition the active quenching-recharging circuit is activated,
wherein the active quenching-recharging circuit is configured to discharge the internal capacitor on a condition the active quenching-recharging circuit is deactivated;
a digital output configured to output a digital value corresponding to a potential generated at an output node of the active quenching-recharging circuit;

a level shifter coupled to the output node and configured to convert an output potential at the output node to the digital value; and a clocked 1-bit memory device configured to receive the clock signal from the clock signal generator, receive the digital value from the level shifter, and output the digital value at each clock pulse of the clock signal on a per clock cycle basis; and a summing circuit configured to receive digital values from the array of microcells and generate a digital pixel value for the SiPM based on a sum of the digital values.

17. The digital SiPM device of claim 16, wherein each active quenching-recharging circuit comprises:

a control terminal coupled to the clock signal generator, wherein the control terminal is configured to receive the clock signal to actively charge the internal capacitor of a corresponding SPAD based on a charging condition being satisfied, wherein the charging condition is satisfied on a condition that a clock pulse of the clock signal is received while the internal capacitor of the corresponding SPAD is in a discharged state.

18. The digital SiPM device of claim 16, wherein the internal capacitor is discharged in response to the SPAD receiving the photon.

19. The digital SiPM device of claim 17, wherein the internal capacitor is in the discharged state when a capacitor voltage of the internal capacitor is less than a bias voltage potential.

20. The digital SiPM device of claim 19, wherein:
each SPAD has a breakdown voltage that is less than the bias voltage potential, and
each internal capacitor is configured in the discharged state when its capacitor voltage is equal to or less than the breakdown voltage.

21. The digital SiPM device of claim 20, wherein:
each active quenching-recharging circuit is configured to turn on in response to the charging condition being satisfied, thereby charging its internal capacitor to the bias voltage potential, and
each active quenching-recharging circuit is configured to turn off in response to its internal capacitor being charged to the bias voltage potential and remains off until the charging condition is re-satisfied.

22. The digital SiPM device of claim 21, wherein each SPAD is configured to turn off in response to its internal capacitor discharging to the discharged state and remains off until receiving a further photon.

23. The digital SiPM device of claim 21, wherein:
each internal capacitor is configured to be discharged in response to its SPAD receiving the photon, and
the clock signal generator and each active quenching-recharging circuit impose a hold time between a time a respective internal capacitor is discharged to the discharged state and a time the charging condition is satisfied or re-satisfied for the respective internal capacitor before enabling a charging of the respective internal capacitor to the bias voltage potential.

24. The digital SiPM device of claim 16, wherein:
the SPAD and each active quenching-recharging circuit are configured to generate a first potential at the output node in response to a corresponding SPAD being turned on, and
the SPAD and each active quenching-recharging circuit are configured to generate a second potential at the output node in response to the corresponding SPAD being turned off.

25. The digital SiPM device of claim 24, wherein each SPAD is configured to turn off in response to its internal capacitor discharging to a discharged state and remains off until receiving a further photon.

26. The digital SiPM device of claim 16, wherein the array of microcells are synchronously recharged on each clock cycle of the clock signal.

27. The digital SiPM device of claim 16, wherein on each clock pulse of the clock signal, discharged SPADs being in a discharged state are synchronously recharged such that a corresponding internal capacitor of each of the discharged SPADs is charged to a bias voltage potential.

28. A method of synchronously operating a plurality of single-photon avalanche diodes (SPADs) of a digital silicon photomultiplier (SiPM), the method comprising:

providing a bias voltage potential;

generating a clock signal comprised of clock pulses that are generated at a predetermined frequency;

providing the clock signal to a plurality of microcells of the digital SiPM, wherein each of the plurality of microcells comprises a corresponding SPAD of the plurality of SPADs and a corresponding active quenching-recharging circuit that is triggered by the clock signal;

controlling an activation state of each active quenching-recharging circuit based on the clock signal received at a control terminal of the corresponding active quenching-recharging circuit;

charging an internal capacitor of a corresponding SPAD of the plurality of SPADs on a condition the corresponding active quenching-recharging circuit is activated;

discharging an internal capacitor of a corresponding SPAD of the plurality of SPADs on a condition the corresponding active quenching-recharging circuit is deactivated;

converting an output potential generated at an output node of the corresponding active quenching-recharging circuit to a digital value; and outputting the digital value of each of the plurality of microcells at each clock pulse of the clock signal on a per clock cycle basis, wherein converting the output potential generated at the output node of the corresponding active quenching-recharging circuit to the digital value comprises level-shifting the output potential to the digital value by a corresponding level shifter, and wherein outputting the digital value of each of the plurality of microcells at each clock pulse of the clock signal on a per clock cycle basis comprises receiving, at a corresponding clocked 1-bit memory device, the clock signal from the clock signal generator and the digital value from the corresponding level shifter, and outputting, by the corresponding clocked 1-bit memory device, the digital value at each clock pulse of the clock signal on a per clock cycle basis.

29. The method of claim 28, further comprising:
controlling the activation state of each corresponding active quenching-recharging circuit based on the clock signal received at its control terminal and based on a charging condition of its corresponding SPAD being satisfied, wherein the charging condition is satisfied on a condition that a clock pulse of the clock signal is received while an internal capacitor of a corresponding SPAD is in a discharged state.

30. The method of claim 28, further comprising:
a summing digital values output from the plurality of microcells at each clock pulse of the clock signal to generate a digital pixel value for the SiPM based on a sum of the digital values.

31. The method of claim 28, further comprising:
synchronously recharging the plurality of microcells on each clock cycle of the clock signal.

32. The method of claim 28, further comprising:
on each clock pulse of the clock signal, synchronously recharging discharged SPADs being in a discharged state such that a corresponding internal capacitor of each of the discharged SPADs is charged to the bias voltage potential.

33. The method of claim 28, further comprising:
actively recharging the internal capacitor of a corresponding SPAD of the plurality of SPADs with the clock signal received at the control terminal of the corresponding active quenching-recharging circuit based on a charging condition being satisfied, wherein the charging condition is satisfied on a condition that a clock pulse of the clock signal is received at the control terminal of the corresponding active quenching-recharging circuit while the internal capacitor of a corresponding SPAD of the plurality of SPADs is in a discharged state.

34. A system configured to flexibly configure at least one silicon photomultiplier (SiPM), the system comprising:
an array of microcells, each comprising:
a single-photon avalanche diode (SPAD) configured to turn on and generate an avalanche current in response to receiving a photon, the SPAD comprising an anode terminal, a cathode terminal, and an internal capacitor coupled internally between the anode terminal and the cathode terminal;
an active quenching-recharging circuit that is triggered by the clock signal, wherein the active quenching-recharging circuit is configured to be activated and deactivated based on the clock signal,
wherein the active quenching-recharging circuit is configured to recharge the internal capacitor on a condition the active quenching-recharging circuit is activated,
wherein the active quenching-recharging circuit is configured to discharge the internal capacitor on a condition the active quenching-recharging circuit is deactivated; and
a digital output configured to output a digital value corresponding to a potential generated at an output node of the active quenching-recharging circuit;
a controller configured to dynamically group a portion of microcells of the array of microcells to form a SiPM.

35. The system of claim 34, wherein the controller is configured to determine an area of the array of microcells at which backscattered laser light is expected to be received, determine the portion of microcells located in the determined area, and group the determined portion of microcells together to form the SiPM.

36. The system of claim 35, wherein:
the area of the array of microcells at which backscattered laser light is expected to be received changes over time, and
the controller is configured to reconfigure the SiPM as the area changes over time.

37. The system of claim 36, further comprising
a summing circuit configured to receive digital values from the portion of microcells and generate a digital pixel value for the SiPM based on a sum of the digital values.

38. The system of claim 34, further comprising
a summing circuit configured to receive digital values from the portion of microcells and generate a digital pixel value for the SiPM based on a sum of the digital values.

* * * * *